United States Patent [19]

Sato

[11] Patent Number: 5,519,531
[45] Date of Patent: May 21, 1996

[54] MICROSCOPE

[75] Inventor: Manabu Sato, Yokohama, Japan

[73] Assignee: Nikon Corporation, Tokyo, Japan

[21] Appl. No.: 216,366

[22] Filed: Mar. 23, 1994

Related U.S. Application Data

[63] Continuation of Ser. No. 931,390, Aug. 18, 1992, abandoned.

[30] Foreign Application Priority Data

Aug. 26, 1991 [JP] Japan ..................... 3-213849

[51] Int. Cl.⁶ ................................. G02B 21/00
[52] U.S. Cl. ................ 359/380; 359/268; 359/379
[58] Field of Search .................. 359/368, 369, 359/372–384, 429–431, 385–389, 368–369, 372–389, 429–431

[56] References Cited

U.S. PATENT DOCUMENTS

| | | | |
|---|---|---|---|
| 1,649,068 | 11/1927 | Köhler | 359/379 |
| 4,175,826 | 11/1979 | Blaha et al. | 359/384 |
| 4,208,089 | 6/1980 | Netto | 359/379 |
| 4,448,498 | 5/1984 | Muller et al. | 359/363 |
| 4,634,241 | 1/1987 | Kohayakawa et al. | 359/377 |
| 4,650,296 | 3/1987 | Tsuchiya | 359/380 |
| 4,690,519 | 9/1987 | Clark et al. | 359/376 |
| 4,798,451 | 1/1989 | Fujiwara | 359/384 |
| 4,802,749 | 2/1989 | Togino et al. | 359/363 |
| 4,889,426 | 12/1989 | Faltermeier | 359/372 |

FOREIGN PATENT DOCUMENTS

| | | | |
|---|---|---|---|
| 88985 | 9/1983 | European Pat. Off. | 359/381 |
| 123310 | 5/1990 | Japan | 359/383 |

*Primary Examiner*—Thong Q. Nguyen
*Attorney, Agent, or Firm*—Shapiro and Shapiro

[57] ABSTRACT

There is disclosed a microscope provided with a parallel ray optical system, for forming parallel light rays, between the objective lens and the eyepiece lens. A lens barrel supporting the parallel ray optical system is axially extended or retracted with respect to the objective lens, such as by mutual engagement of a ratchet and a claw member, thereby varying the optical path length of the parallel light rays and thus adjusting the height of the eyepiece lens.

19 Claims, 7 Drawing Sheets

MICROSCOPE

This is a continuation of application Ser. No. 07/931,390 filed Aug. 18, 1992, now abandoned.

BACKGROUND OF THE INVENTION

1. Field of the Invention

The present invention relates to a microscope allowing adjustment of the height of the eyepiece lens (eye point).

2. Related Background Art

Among such microscopes, there is already known one equipped with an eyepiece lens barrel with a variable dip viewing angle, as disclosed in U.S. Pat. Nos. 4,175,826 and 4,798,451. Such microscope allows the user to select the height of the eyepiece lens by adjusting the dip viewing angle, which is the angle of the eyepiece lens barrel.

Due to the presence of a mechanism for adjusting the dip viewing angle, the optical system and the mechanisms in the lens barrel become complex and bulky resulting in an elevated cost. Moreover, in such known microscope it has not been possible simply to adjust only the height of the eyepiece lens, because the adjustment of the dip viewing angle changes not only the height of the eyepiece lens but also the horizontal distance from a mirror to the eyepiece lens.

SUMMARY OF THE INVENTION

The object of the present invention is to provide a microscope allowing adjustment of the height of the eyepiece lens by means of a relatively simple and compact mechanism.

This microscope is provided, between the objective lens and the eyepiece lens, with a parallel optical system for forming a parallel light beam, and the adjustment of the height of the eyepiece lens is achieved by a variation in the optical path length of said parallel light beam. The present invention is applicable not only in an erect image microscope but also in an inverted microscope.

The microscope of the present invention will be outlined in the following, with reference to FIGS. 5 to 8. FIG. 5 illustrates the imaging optical system of an ordinary microscope. In such ordinary microscope, a primary image of a specimen 100 is formed by an objective lens 101 on the focal plane 102a of an eyepiece lens 102. In such microscope, in order to satisfy a condition that the primary image of the specimen is formed in a constant position even when the objective lens is varied in the magnification relationship (mutual distance) among the specimen, objective lens and eyepiece lens, the length B of the lens barrel is determined in advance and cannot be modified in each microscope.

The microscope of the present invention further includes, as shown in FIG. 6, a concave lens 112 at the image side of the objective lens 101, and a convex lens 113 on the parallel optical path, wherein said concave lens serves to form a parallel light beam while said convex lens 113 serves to converge said parallel light beam. Stated differently, in said microscope, the primary image of the specimen, formed by the objective lens 101, is focused by means of said concave lens 112 and convex lens 113 at the focal plane of said convex lens 113, and the focal plane 102a of the eyepiece lens is positioned at the focal position of said convex lens 113.

Consequently, in this microscope, the optical system from the convex lens 113 to the eyepiece lens can be displaced in the axial direction of the parallel beam optical system, since the distance from the convex lens 113 to the focal position 102a is constant regardless of the optical path length of the parallel beam optical system.

FIG. 7 illustrates another microscope having a parallel beam optical system, in which a parallel light beam as in FIG. 6 is created by an objective lens 111 for infinite image distance for converting the light from the specimen into a parallel light beam. Also in this microscope, the distance from the convex lens 123 to the focal position 102a is constant. In the present invention, the parallel light beam may be created by either of the configurations shown in FIGS. 6 and 7.

FIG. 8 shows the relationship of the optical path lengths of the microscope shown in FIG. 6. In this microscope, the imaging relationship (relative positional relationship) from the convex lens 113 to the eyepiece lens remains constant when a portion of the path shown within a block 103 is moved by a distance a in the axial direction of the parallel beam optical system.

The present invention utilizes on the above-explained relationship. More specifically, the microscope of the present invention may employ either of the following two configurations, in order to vary the optical path length of a parallel light beam between first optical means (a concave lens or an objective lens for infinite image distance) for creating said parallel light beam and second optical means (convex lens) for condensing said parallel light beam. In the first configuration, relative to the concave lens 112 shown in FIG. 6 (or the objective lens 111 in FIG. 7), there is moved an optical system from the convex lens 113 to the eyepiece lens 102 (or from the convex lens 123 to the eyepiece lens 102 in FIG. 7) corresponding to the portion 103 in FIG. 8. In the second configuration, the axial length of a lens barrel supporting an optical system from the convex lens 113 to the eyepiece lens 102, corresponding to the portion 103 in FIG. 8 (also corresponding to portions 11 to 7 in FIG. 4) is regulated by inserting or removing an intermediate barrel (corresponding to 60 in FIG. 4). The height of the eyepiece lens can be adjusted with either of these configurations.

Consequently, the microscope of the present invention can adjust the height of the eyepiece lens with a simple construction, not employing the conventional mechanism for adjusting the dip viewing angle. Thus this microscope can be constructed more compactly and with a lower cost.

DESCRIPTION OF THE PREFERRED EMBODIMENTS

FIGS. 1 to 3B illustrate a first embodiment of the present invention.

Figure 1:
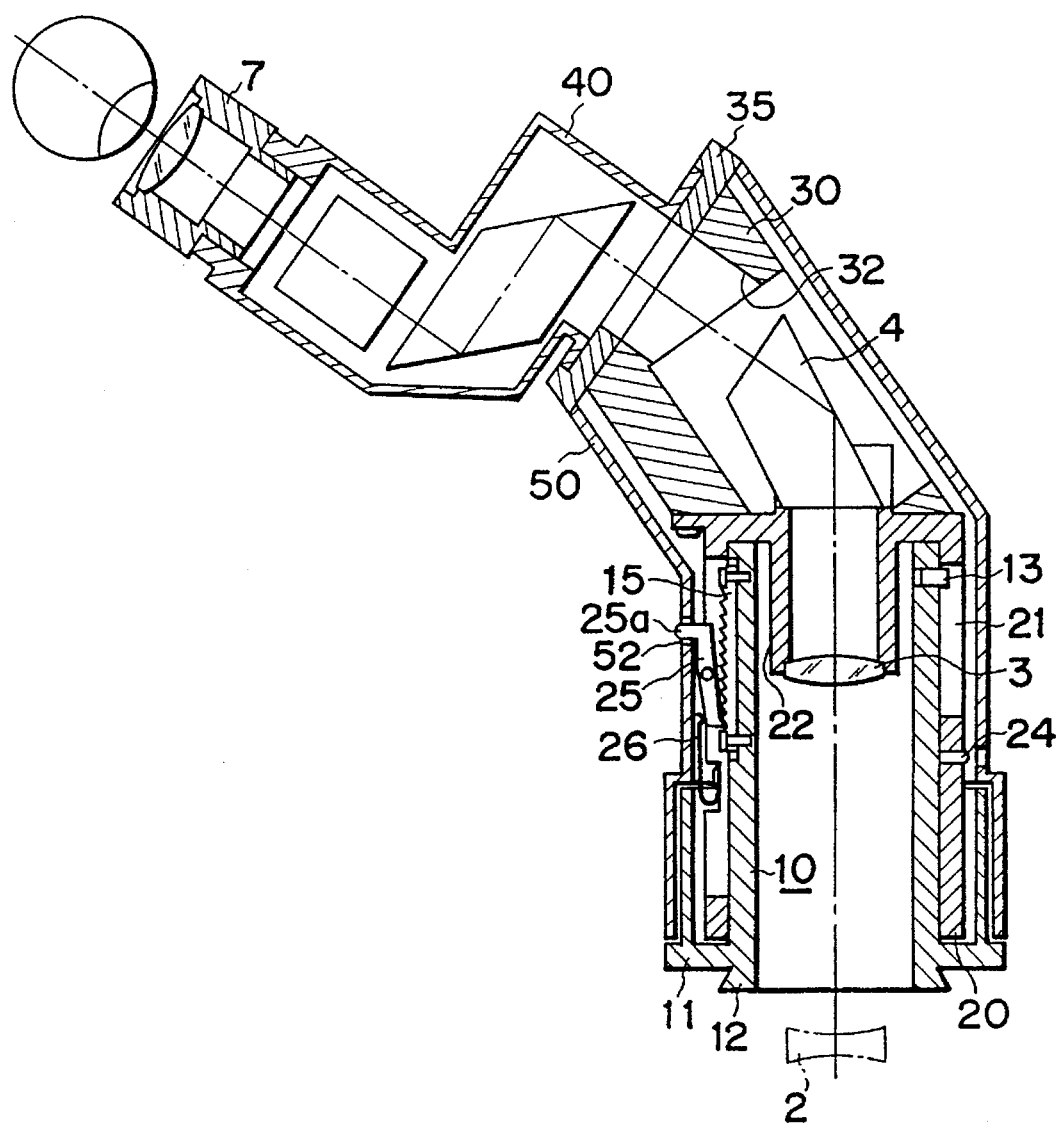
FIG. 1 is a partial cross-sectional view of a microscope, constituting a first embodiment of the present invention.
Figure 2:
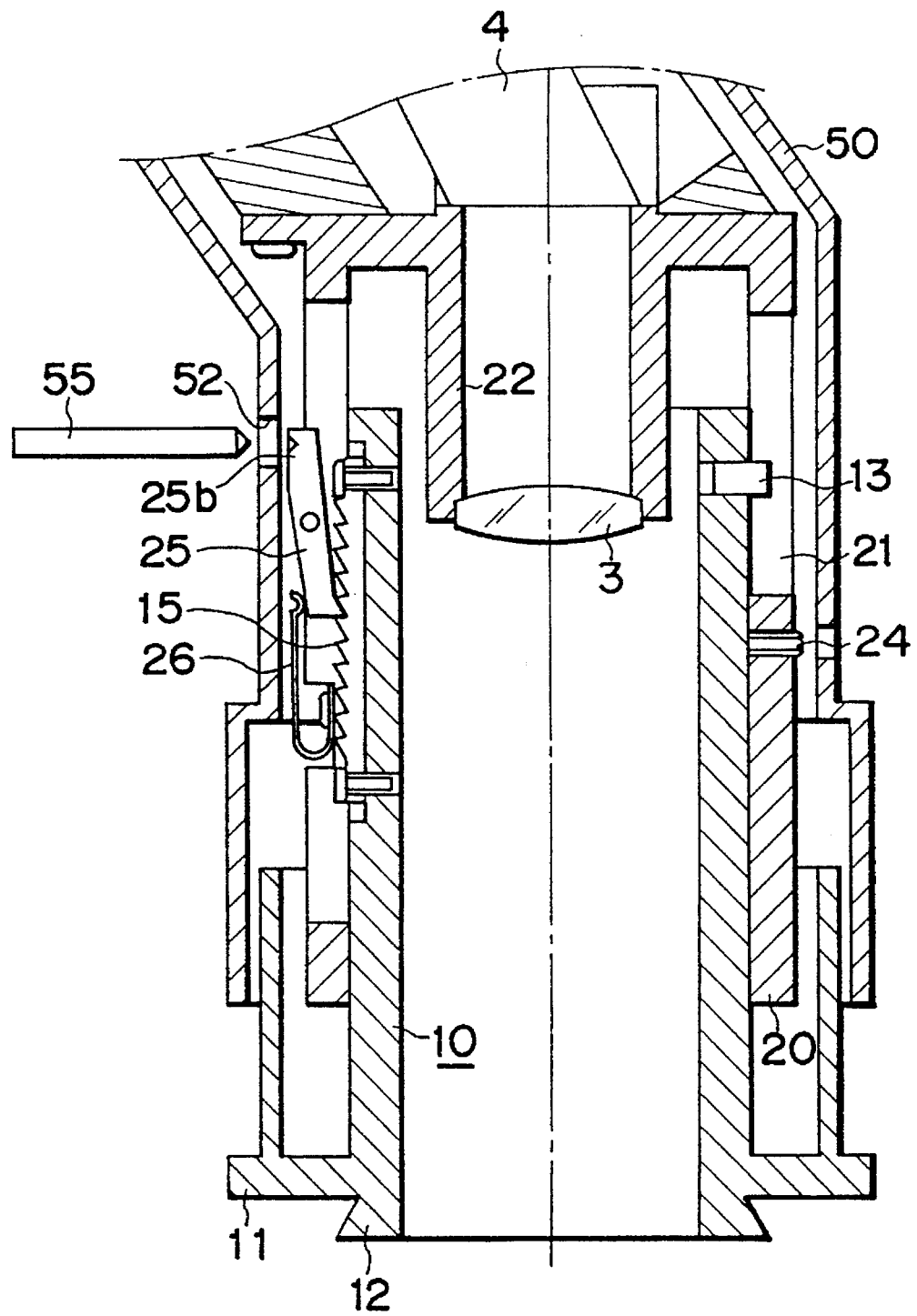
FIG. 2 is a partial magnified cross-sectional view of a variant of the microscope of the first embodiment of the present invention.
Figure 3:
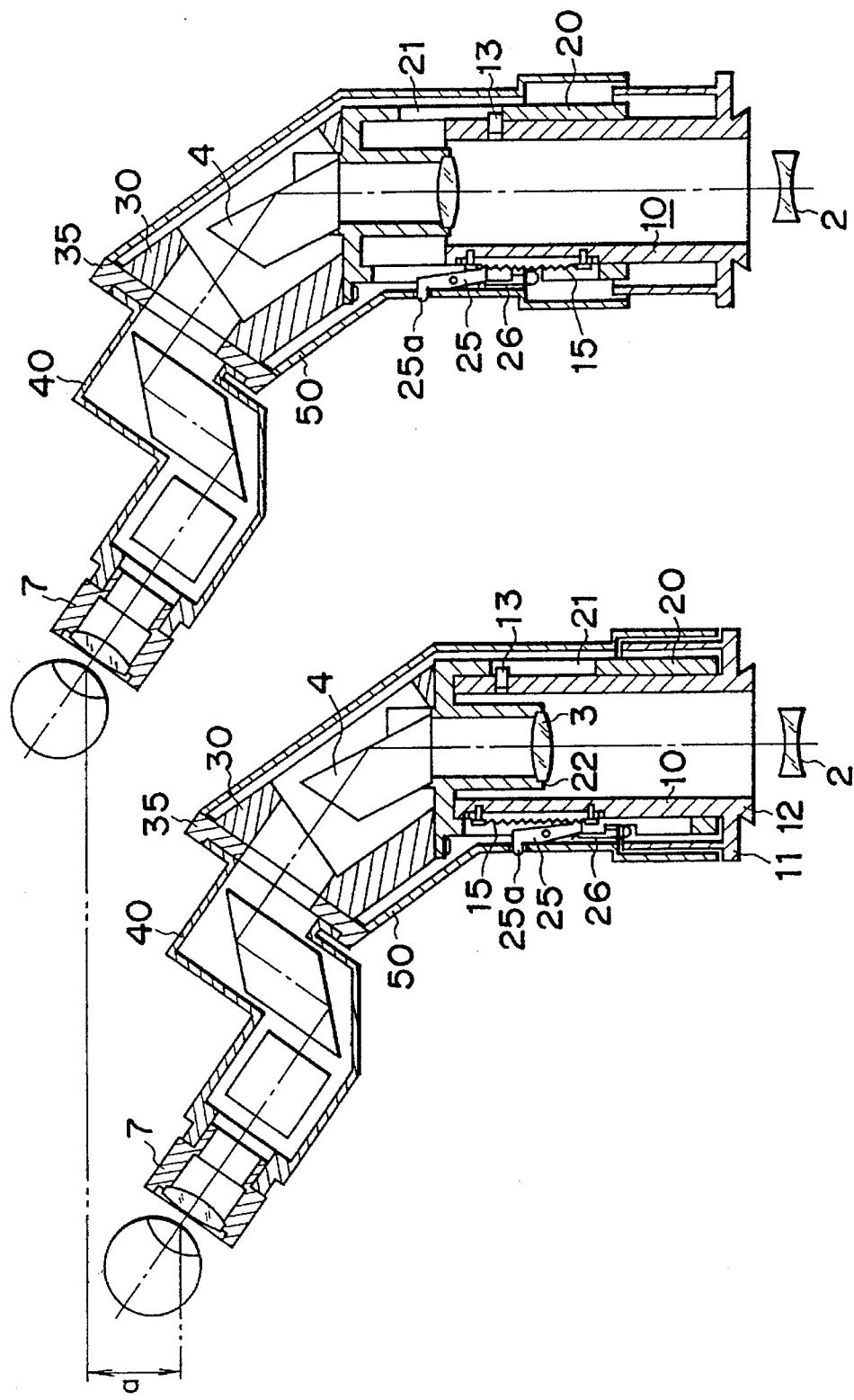
FIGS. 3A and 3B are views showing the function of the microscope of the first embodiment of the present invention.

As shown in FIGS. 1 and 2, a lens barrel 10 is provided, at the lower part thereof, with a flange-shaped mount 11 and an annular tenon 12. Said tenon is fixed to an main body (now shown) of the microscope, in which a concave lens is incorporated.

On said lens barrel 10 there is axially slidably fitted an outer tube 20 which is provided with a vertically extending guide groove 21. The lens barrel 10 is provided with a pin member 13 for engaging with said guide groove 21. Said pin member 13 is rendered, by said guide groove 21, vertically movable relative to the outer tube 20 but immobile in the circumferential direction of said outer tube 20. On the outer tube 20, a clamping screw 24 is screwed and impinges on the external periphery of the lens barrel 10, thereby mutually fixing the lens barrel 10 and the outer tube 20. Said screw 24 is provided for fixing the lens barrel 10 in a desired position, in case frequent vertical adjustments are not required.

A fitted tube 22, fitted in the lens barrel 10 from above, is formed in the upper part of the outer tube 20, and is provided with a convex lens 3 at the lower end and a prism 4 for deflecting the optical axis at the upper end.

At the upper end of the outer tube 20, an intermediate member 30 is provided so as to extend the length of the lens barrel, and the light beam deflected by the prism 4 passes through the internal space 32 of said intermediate member 30. A binocular unit 40 is supported at the upper end of the intermediate member 30, across a relay member 35. Eyepiece lenses 7 are mounted on the upper end of said binocular unit 40.

A lens barrel 50 is so provided as to cover the outer tube 20 and the intermediate member 30, and is fixed at the upper end to the relay member 35. Thus the lens barrel cover 50 can move integrally with the outer tube 20, by means of the relay member 35 and the intermediate member 30.

The lens barrel 10 is provided, at the upper part thereof, with a ratchet 15 having teeth in the vertical direction, and the outer tube 20 is provided with a claw member 25 stepwise engaging with said ratchet 15. The claw member 25 is biased, by a spring member 26, in a direction engaging with the ratchet 15. Said ratchet 15 and claw member 25 constitute components of a telescoping mechanism.

An operating end 25a of the claw member 25 extends externally through an operating hole 52 formed in the lens barrel cover 50. In case frequent vertical adjustments are not required, the operating end may be positioned inside the lens barrel cover 50, as indicated by 25b in FIG. 2, so as to be actuated by an operating rod 55 through the operating hole 52.

In FIG. 3A, the eyepiece lenses 7 are in a lowered position, and the claw member 25 engages with a tooth in the lower part of the ratchet 15.

As the lens barrel cover 50 is lifted, the pin member 13, being guided by the guide groove 21, moves downwards in relative manner, whereby the outer tube 20 moves upwards relative to the lens barrel 10. In this movement, the claw member 25 elastically engages with the teeth of the ratchet 15 in succession, from the lower part to the upper part thereof.

Figure 8:
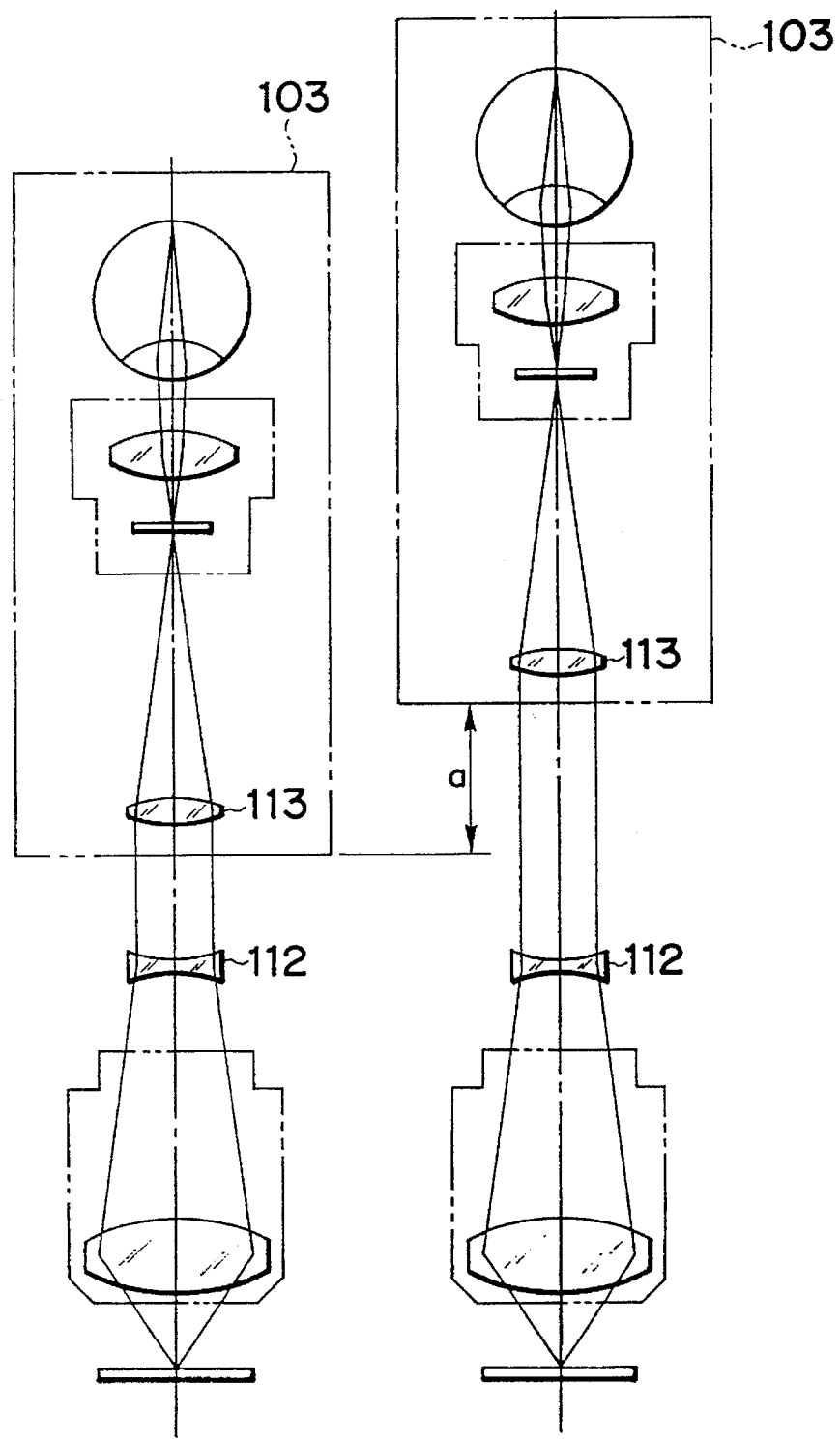

In this operation, the optical path length between the concave lens 2 and the convex lens 3 extends, but the imaging state beyond the convex lens 3 is not affected because the parallel light beam exists between said lenses. FIG. 3B illustrates a state in which the optical path length is extended by a, and FIG. 8 conceptually illustrates said state.

In the state shown in FIG. 3B, the claw member 25 engages with an upper tooth of the ratchet 15, while the eyepiece lenses 7 are in the uppermost position, and the outer tube 20 is rendered immobile downwards with respect to the lens barrel 10.

If the operating end 25a of the claw member 25 is pressed in against the biasing force of the spring member 26, the claw member 25 is disengaged from the tooth of the ratchet 15, whereby the outer tube 20 is rendered movable downwards with respect to the lens barrel 10, and the eyepiece lenses 7 can be returned to the lower original position.

Thus the eye point can be adjusted by the pitch of teeth of the ratchet 15. When the ratchet 15 and the claw member 25 mutually engage, the eyepiece lenses are not lowered even under a depressing force applied from above.

Figure 4:
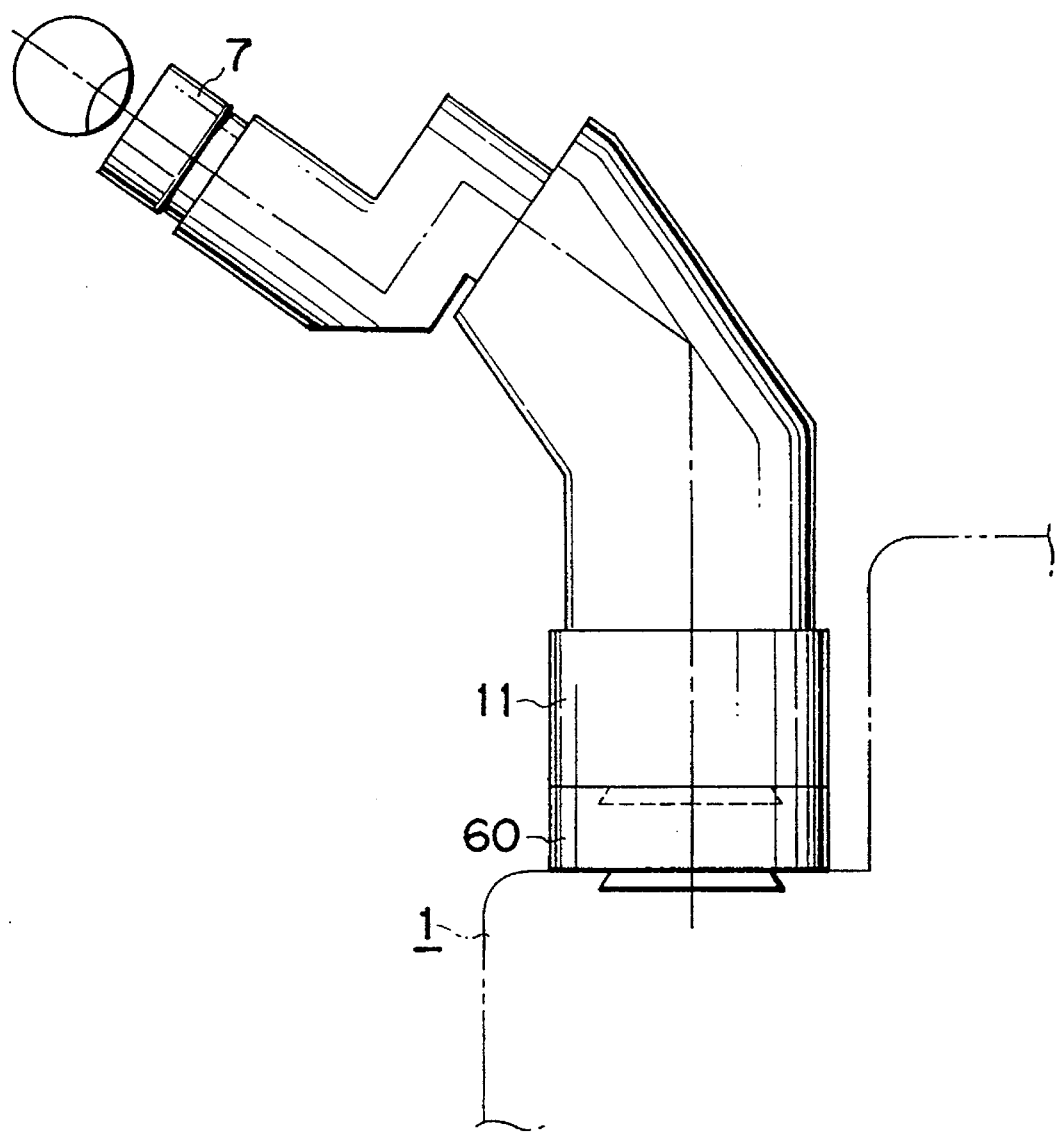
FIG. 4 is an elevation view of a microscope constituting a second embodiment of the present invention.
Figure 5:
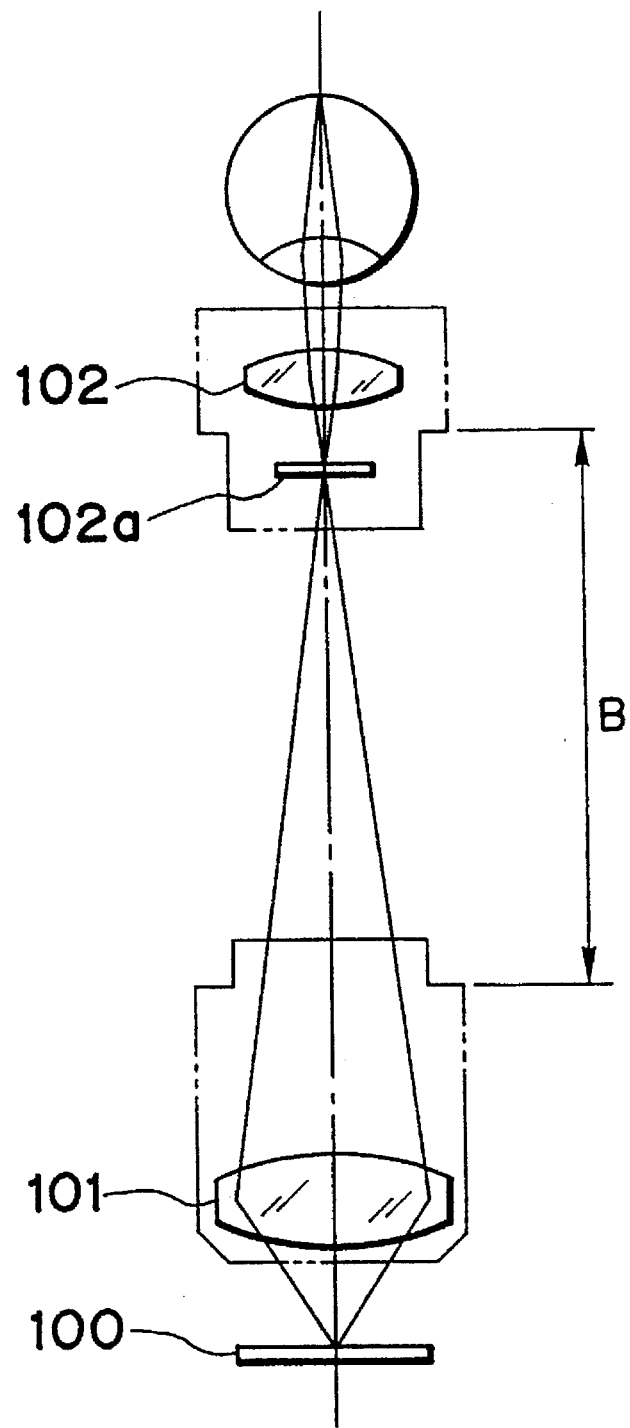
FIGS. 5 to 8 are schematic views explaining the principles of the microscope of the present invention.
Figure 6:
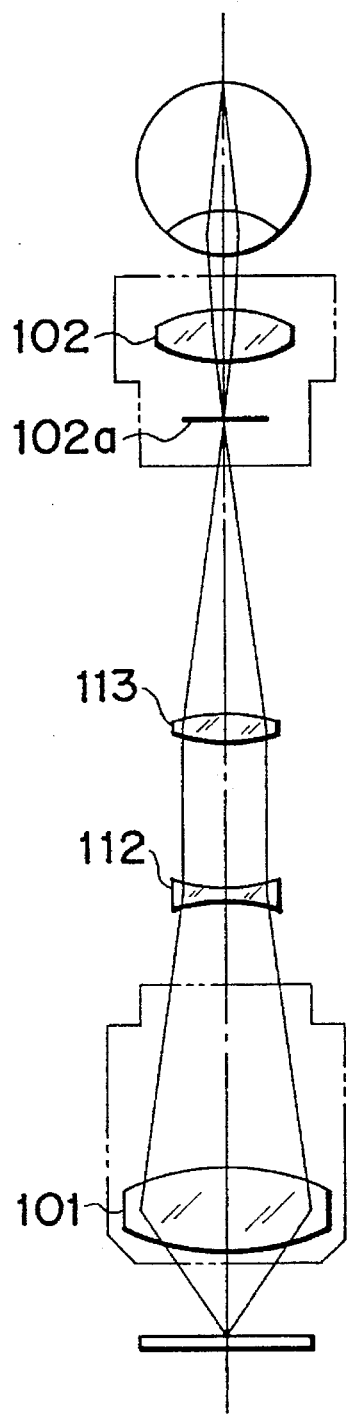
Figure 7:
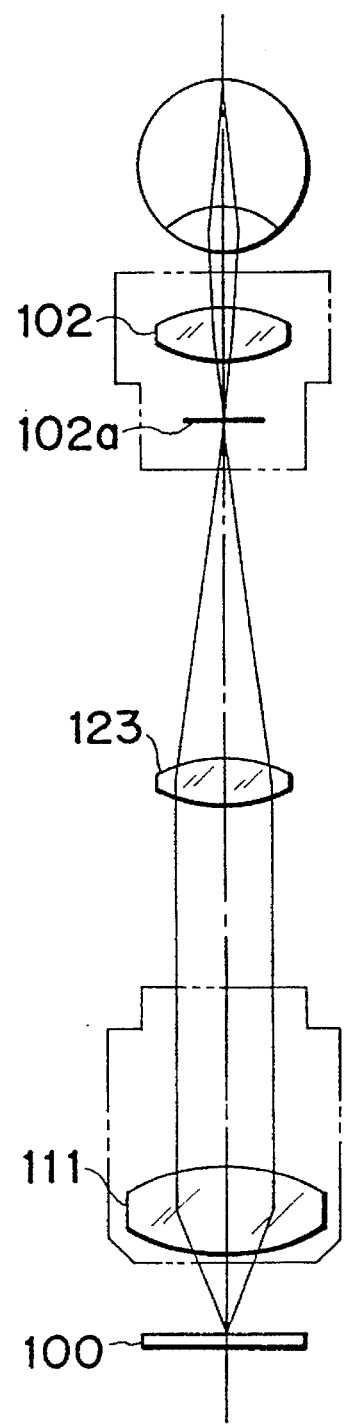

FIG. 4 shows a second embodiment of the present invention, which allows adjustment of the height of the lens barrel 10 without a telescoping mechanism.

Between the main body 1 of the microscope and the mount portion 11 of the lens barrel 10, there is provided a detachable spacer 60, which constitutes height adjusting means for the eyepiece lenses 7. If the spacer 60 is prepared in plural lengths, there can be obtained an effect substantially equal to that of the configuration employing the telescoping mechanism, with an even simpler structure.

Although the foregoing embodiments have been limited to erect image microscopes, the present invention is likewise applicable to inverted microscopes.

What is claimed is:

1. A microscope comprising:

an objective optical system including an objective lens;

an eyepiece optical system including an eyepiece lens;

an intermediate optical system positioned between said objective optical system and said eyepiece optical system, including first optical means for converting light from said objective optical system into parallel light rays and second optical means for condensing said parallel light rays; and adjusting means for adjusting a distance between said first and second optical means while maintaining said second optical means fixed relative to said eyepiece optical system;

said adjusting means including lens barrel means for supporting said second optical means, said lens barrel means having a first tube fixed to a main body of the microscope, and a second tube supporting said second optical means and movable along an axis of said first tube.

2. A microscope according to claim 1, wherein said adjusting means is adapted to displace said second optical means along an optical axis of said intermediate optical system.

3. A microscope according to claim 1, wherein said adjusting means includes a ratchet mechanism for adjustably setting a position of said second tube along the axis of said first tube.

4. A microscope according to claim 1, wherein said adjusting means adjusts said distance by shifting said second optical means.

5. A microscope according to claim 1, further comprising additional lens barrel means for supporting said eyepiece optical system, said additional lens barrel means being fixedly mounted to said second tube.

6. A microscope comprising:

an objective optical system including an objective lens for converting light rays from a specimen into parallel rays;

an eyepiece optical system including an eyepiece lens;

optical means disposed between said objective optical system and said eyepiece optical system for condensing the parallel rays from said objective optical system; and adjusting means for adjusting a distance between said objective optical system and said optical means by shifting said optical means while maintaining said optical means fixed relative to said eyepiece optical system;

said adjusting means including lens barrel means for supporting said optical means, said lens barrel means having a first tube fixed to a main body of the microscope and a second tube supporting said optical means and movable along an axis of said first tube.

7. A microscope according to claim 6, further comprising additional lens barrel means for supporting said eyepiece optical system, said additional lens barrel means being fixedly mounted to said second tube.

8. A microscope comprising:

an objective optical system including an objective lens;

an eyepiece optical system including an eyepiece lens;

an intermediate optical system positioned between said objective optical system and said eyepiece optical system, including first optical means supported by a main body of the microscope for converting the light from said objective optical system into parallel light rays and second optical means for condensing said parallel light rays; and adjusting means for adjusting said eyepiece optical system and said second optical means relative to said first optical means to adjust a distance between said first and second optical means while maintaining a relative positional relationship between said second optical means and said eyepiece optical system unchanged, said adjusting means including a lens barrel for supporting said second optical means and said eyepiece optical system therein and movable along an axis of said first optical means.

9. A microscope according to claim 8, wherein said adjusting means includes a ratchet mechanism for adjusting a position of said lens barrel relative to said first optical means.

10. A microscope comprising:

an objective optical system supported by a main body of the microscope and including an objective lens for converting light rays from a specimen into parallel rays;

an eyepiece optical system including an eyepiece lens;

optical means disposed between said objective optical system and said eyepiece optical system for condensing the parallel rays from said objective optical system; and adjusting means for adjusting a distance between said objective optical system and said optical means by shifting said eyepiece optical system and said optical means while maintaining a relative positional relationship between said optical means and said eyepiece optical system unchanged, said adjusting means including a lens barrel for supporting said optical means and said eyepiece optical system therein and movable along an axis of said objective optical system.

11. A microscope according to claim 10, wherein said adjusting means includes a ratchet mechanism for adjusting a position of said lens barrel relative to said objective optical system.

12. A microscope comprising:

an objective optical system;

an eyepiece optical system;

an intermediate optical system for focusing light from said objective optical system and positioned between said objective optical system and said eyepiece optical system;

a first tube fixed to a main body of the microscope;

a second tube for supporting said intermediate optical system and movable along an axis of said first tube;

eyepiece barrel means for supporting said eyepiece optical system and mounted to said second tube; and adjusting means for adjusting a position of said second tube with respect to said first tube, together with said eyepiece barrel means.

13. A microscope according to claim 12, wherein said intermediate optical system includes a first optical system for converting the light from said objective optical system into parallel light rays and supported by said first tube, and a second optical system for condensing said parallel light rays and supported by said second tube.

14. A microscope according to claim 12, wherein said objective optical system includes an objective lens for converting light from a specimen into parallel light rays.

15. A microscope comprising:

an objective optical system including an objective lens;

an eyepiece optical system including an eyepiece lens;

a first optical system positioned between said objective optical system and said eyepiece optical system for converting light from said objective optical system into parallel light rays;

a second optical system positioned between said first optical system and said eyepiece optical system for focusing said parallel light rays;

a first tube fixed to a main body of the microscope and supporting said first optical system;

a second tube for supporting said second optical system, and movable along an axis of said first tube; and adjusting means for adjusting a position of said second tube with respect to said first tube.

16. A microscope according to claim 15, wherein said first tube is an inner tube, and said second tube is an outer tube.

17. A microscope according to claim 16, wherein said adjusting means includes a ratchet mechanism for adjusting the position of said outer tube with respect to said inner tube.

18. A microscope according to claim 15, further comprising an eyepiece barrel means for supporting said eyepiece optical system, said eyepiece barrel means being fixed to said second tube.

19. A microscope comprising:

an objective optical system including an objective lens;

an eyepiece optical system including an eyepiece lens;

an intermediate optical system positioned between said objective optical system and said eyepiece optical system, including a first optical member fixed to a main body of the microscope for converting light from said objective optical system into parallel light rays and a second optical member for condensing said parallel light rays; and a lens barrel supporting said second optical member and said eyepiece optical system therein and movable along an axis of said first optical member.

* * * * *